UNITED STATES PATENT OFFICE.

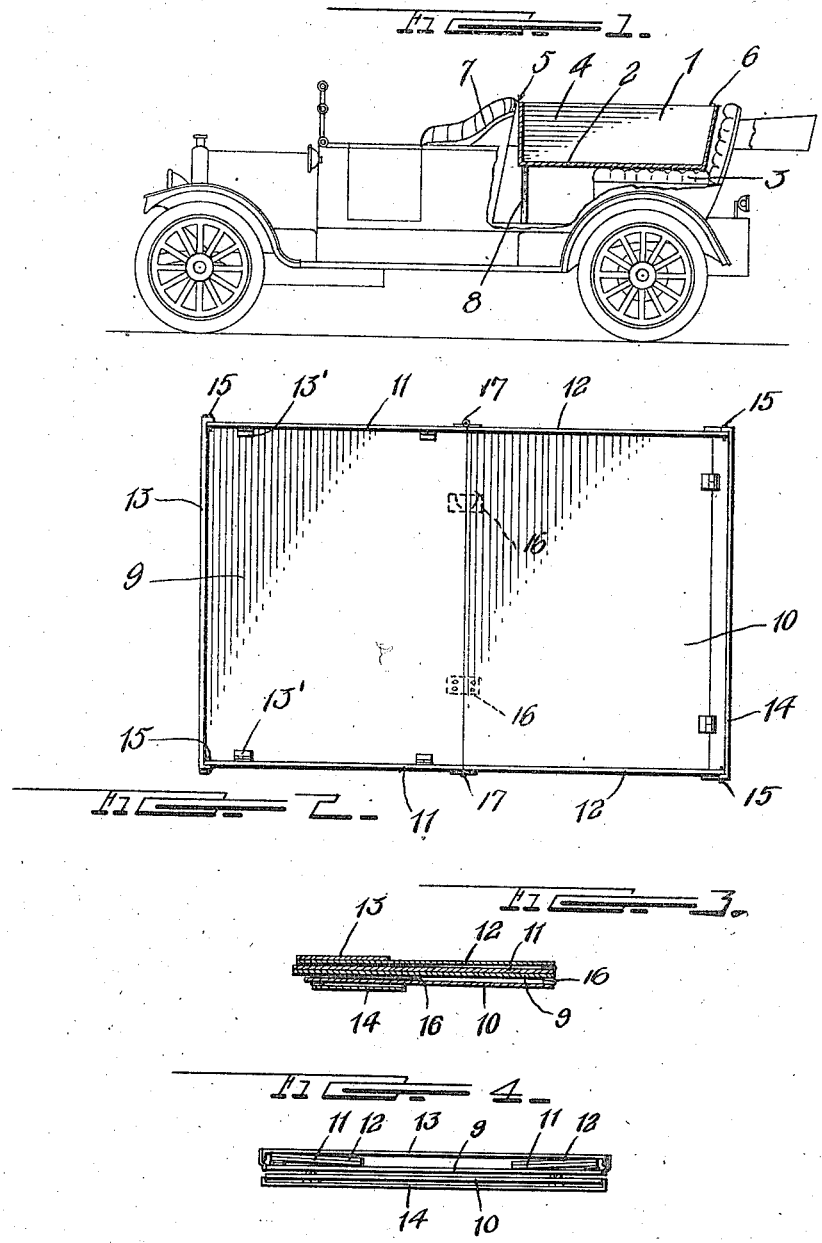

OSWALD H. GORDON, OF MANLY, NORTH CAROLINA.

AUTOMOBILE ATTACHMENT.

1,233,661. Specification of Letters Patent. Patented July 17, 1917.

Application filed March 15, 1916. Serial No. 84,414.

*To all whom it may concern:*

Be it known that I, OSWALD H. GORDON, a citizen of the United States, residing at Manly, in the county of Moore and State of North Carolina, have invented certain new and useful Improvements in an Automobile Attachment, of which the following is a specification.

My invention relates broadly to a carrier attachment and more particularly to an attachment for converting a passenger carrier such as an aeroplane, automobile, or motor boat into a carrier adapted for receiving freight.

The primary object of my invention resides in the provision of a device as above described embodying primarily a receptacle which is adapted for removable association with the seats of a passenger carrier adapting said carrier for transporting freight from place to place in a convenient and expeditious manner.

Another object of my invention resides in the provision of a receptacle for accomplishing the before mentioned purpose, that is foldable into a compact form in such a manner that it can be conveniently carried beneath the seat of the vehicle of the carrier with which it is associated when in use.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—

Figure 1 represents a side elevation of a carrier or automobile, a portion thereof being broken away to illustrate the arrangement of one form of receptacle therewith, the latter being shown in longitudinal section;

Fig. 2 is an enlarged plan of a modified form of receptacle;

Fig. 3 is a longitudinal section taken through the modified or folding form of receptacle when in a folded position; and Fig. 4 is an end elevation of the modified form in a folded position.

Referring more particularly to the drawings in which similar reference numerals designate like or corresponding parts throughout the several views, I have associated with a carrier such as an aeroplane, motor boat, automobile, the latter being shown in the drawings, my improved receptacle 1 for converting the passenger carrier to a carrier adapted for receiving freight to be transported.

The receptacle comprises a bottom 2 which is positioned to rest upon the rear seat 3 of a vehicle. Side pieces 4 are connected to the bottom, said side pieces incidentally being connected to the end pieces 5 and 6 which are in turn connected to the bottom. The end piece 6 is arranged at an angle toward the bottom to conform to the angle of inclination of the back to the rear seat 3, with which said end piece 6 is arranged in closely spaced relation throughout its length. The sides 4 are arranged in closely spaced relation with the inner sides of the rear portion of the body between the front and rear seats while the front end 5 is arranged in closely spaced relation with the back of the front seats 7 as indicated to advantage in the accompanying drawing. A leg 8 is connected to the bottom of the body adjacent the forward end 5, the free end thereof resting upon the bottom of the body of the carrier so as to support the receptacle in position in the carrier. Because of the construction and arrangement of the receptacle just described it will be understood that the same can be conveniently used without seriously damaging the upholstery of the carrier with which it is associated permitting the latter to be used as a merchandise carrier when the attachment is in position and permitting passengers being seated in the car after the attachment has been removed.

In Figs. 2 and 3 and 4 I have shown a slightly modified form of receptacle and in this instance this modified form comprises a bottom formed of two sections 9 and 10 connected together by the hinge members 16, and side members consisting of two sections 11 and 12 pivoted together by hinge members 17, the sections 11 being pivoted to section 9 of the bottom through the medium of hinges 13'. The receptacle is completed by the end sections 13 and 14 which are pivoted to the free edges of the sections 9 and 10 and have their side edges removably connected with the side sections through the medium of suitable fastening devices 15. The end piece 14 in order to conform to the back of the rear seat is arranged at an angle to the section 10 of the bottom. A leg 16 is connected to the section 9 of the bottom and serves the same purpose at the leg 8.

In collapsing the modified form of the receptacle in order that it can be folded into a compact form to permit of its being conveniently carried beneath the seat of a carrier with which it is associated when in use, the fastening devices 15 are removed to permit of the folding of the sections 11 and 12 of the sides upon themselves as shown in Fig. 3, and then the folding of these folded sides on the section 9 of the bottom. The end 13 is now folded upon the folded side sections while the section 10 of the bottom is folded in juxtaposed relation with the under surface of the section 9 and the end 14 is finally folded into juxtaposed relation with the section 10 of the bottom.

Although I have shown and described the preferred embodiment of my invention I desire it to be understood that I am not to be limited to the exact details shown, however, I desire that great stress be laid upon the arrangement of the receptacle for association with a carrier for converting the carrier from one adapted for transporting passengers to one adapted for transporting freight or vice versa.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantage of my invention.

Having thus fully described my invention, what I claim as new and desire to secure by Letters Patent, is:—

1. A device of the character described for use with carriers having front and rear seats therein, comprising a receptacle adapted to be supported on the rear seat, the walls of the receptacle being adapted to lie in close relation with the front surface of the back of the rear seat, the rear surface of the back of the front seat and the sides of the carrier, and a leg pivotally connected to the bottom of the receptacle for engagement with the floor of the carrier for supporting the receptacle in position.

2. A device of the character described for use with carriers having front and rear seats therein, comprising a receptacle including a plurality of sections, means for pivotally connecting the sections to permit of extending the receptacle to occupy the space between the front and rear seats so that freight may be transported in the carrier and to permit of the folding of the receptacle so that it may be carried beneath the seat when not in use, and a folding leg connected to the receptacle for engagement with the floor of the carrier for supporting the receptacle when in an extended position.

3. A device of the character described for use with carriers having front and rear seats therein, comprising a foldable receptacle adapted to be removably arranged on the rear seat, the rear end of the receptacle being arranged at an angle to the bottom thereof and adapted to conform to the contour of the back seat, the other walls of the receptacle being respectively adapted to lie in close relation with the back of the front seat and the sides of the carrier, and a leg connected to the bottom of the receptacle for engagement with the floor of the carrier for supporting the receptacle in position.

In testimony whereof I affix my signature in presence of two witnesses.

OSWALD H. GORDON.

Witnesses:
S. A. HUNTER,
J. W. PHILLIPS.